United States Patent [19]
Lee

[11] Patent Number: 6,138,460
[45] Date of Patent: Oct. 31, 2000

[54] TEMPERATURE CONTROL APPARATUS FOR REFRIGERATOR AND CONTROL METHOD THEREFOR

[75] Inventor: Gi-Hyeong Lee, Kwangju, Rep. of Korea

[73] Assignee: Samsung Electronics Co., Ltd., Suwon, Rep. of Korea

[21] Appl. No.: 09/388,386

[22] Filed: Sep. 1, 1999

[30] Foreign Application Priority Data

Sep. 2, 1998 [KR] Rep. of Korea .................... 98-36073

[51] Int. Cl.[7] .............................. F25D 17/06; F25D 17/04
[52] U.S. Cl. ................................. 62/89; 62/186; 62/414; 62/419; 62/426
[58] Field of Search ........................... 62/89, 186, 151, 62/155, 156, 179, 187, 199, 229, 414, 419, 426

[56] References Cited

U.S. PATENT DOCUMENTS

| | | | |
|---|---|---|---|
| 5,775,124 | 7/1998 | Park et al. | 62/414 |
| 5,826,437 | 10/1998 | Kim | 62/426 |
| 5,870,898 | 2/1999 | Choi . | |
| 6,041,616 | 3/2000 | Jeong | 62/419 |

*Primary Examiner*—William E. Tapolcal
*Assistant Examiner*—Mohammad M. Ali
*Attorney, Agent, or Firm*—Larson & Taylor

[57] ABSTRACT

A temperature control apparatus for a refrigerator and a control method therefor, mount an air circulation fan in addition to a prior refrigerating fan into the refrigerating compartment, drive the air circulation fan together with the refrigerating fan or drive only the air circulation fan, obtain a uniform cooling effect of a refrigerating compartment, feebly circulate a cool air when opening a door of the refrigerating compartment, and quickly cool the refrigerating compartment after closing the door. The temperature control apparatus of the refrigerator includes: an air circulation fan which is additionally mounted to the refrigerating compartment, and is separated from the refrigerating fan; and a controller which drives the compressor, the refrigerating fan, and the air circulation fan if a refrigerating compartment temperature sensed by the refrigerating compartment temperature sensor is higher than a refrigerating compartment set temperature, and periodically turns on or off the air circulation fan under an off state of the refrigerating fan if the refrigerating compartment door is opened.

5 Claims, 6 Drawing Sheets

TEMPERATURE CONTROL APPARATUS FOR REFRIGERATOR AND CONTROL METHOD THEREFOR

BACKGROUND OF THE INVENTION (1) Field of the Invention

The present invention relates to a temperature control apparatus for a refrigerator and a control method therefor. More particularly, it relates to a temperature control apparatus for a refrigerator and a control method therefor, which mount an air circulation fan in addition to a prior refrigerating fan into the refrigerating compartment, drive the air circulation fan together with the refrigerating fan or drive only the air circulation fan, obtain a uniform cooling effect of the refrigerating compartment, feebly circulate a cool air when opening a door of the refrigerating compartment, and quickly cool the refrigerating compartment after closing the door.

(2) Description of the Prior Art

Generally, a refrigerator having two evaporators includes two fans for discharging a cool air generated from the evaporators into a freezing compartment and a refrigerating compartment. One of the two fans is mounted in the freezing compartment, and the other one is mounted in the refrigerating compartment. On/off operation of the freezing and refrigerating fans is controlled by a comparison result between each compartment's temperature and each compartment's set temperature.

A conventional refrigerator will be described with reference to FIG. 1 illustrating a cross-sectional view of a conventional refrigerator.

Referring to FIG. 1, a conventional refrigerator includes a main body 1, a compressor 30, a freezing compartment 10, a refrigerating compartment 20, a freezing compartment door 11, a refrigerating compartment door 21, a freezing evaporator 13, a freezing fan 14, a refrigerating evaporator 23, a refrigerating fan 24, a refrigerating compartment temperature sensor 27, and a freezing compartment temperature sensor 15.

In addition, a reference numeral 12 is a rear wall of the freezing compartment 10, a reference numeral 22 is a real wall of the refrigerating compartment 20, and a reference numeral 25 is a duct 25 which separates the refrigerating fan 24 and the refrigerating evaporator 23 from a storage space of the refrigerating compartment 20, and induces a cool air flow. The reference numeral 26 is a cool air discharge hole 26 for discharging a cool air into the refrigerating compartment 20.

FIG. 2 is a block diagram of a temperature control apparatus for a conventional refrigerator.

As shown in FIG. 2, the temperature control apparatus for a conventional refrigerator includes: a freezing compartment temperature sensor 15 for sensing a temperature of a freezing compartment 10; a refrigerating compartment temperature sensor 27 for sensing a temperature of a refrigerating compartment 20; a door opening/closing sensor 36 for sensing an opening/closing state of the freezing compartment door 11 and the refrigerating compartment door 21; a controller 38 for controlling each compartment's temperature according to both each temperature of the freezing compartment 10 and the refrigerating compartment 20 and a door closing/opening state; a freezing fan 14 for discharging a cool air into the freezing compartment 10; a refrigerating fan 24 for discharging a cool air into the refrigerating compartment 20; a freezing compartment fan driver 40 for driving the freezing fan 14 according to a control signal of the controller 38; a refrigerating compartment fan driver 60 for driving the refrigerating fan 24 according to a control signal of the controller 38; a compressor 30 for compressing a refrigerant; and a compressor driver 80 for driving the compressor 30 according to a control signal of the controller 38.

A cooling operation of the conventional refrigerator will be described as follows.

If a refrigerating compartment temperature sensed by the refrigerating compartment temperature sensor 27 is higher than the refrigerating compartment set temperature, a compressor 30 and a refrigerating fan 24 are driven to generate a cool air. The generated cool air passes through the refrigerating fan 24, and is then provided into the inner space of the refrigerating compartment 20 via a discharge hole 26 provided on the duct 25. During cooling the refrigerating compartment 20, if the refrigerating compartment temperature is higher than the refrigerating compartment set temperature, the compressor 30 and the refrigerating fan 24 are stopped to prevent over-cooling.

However, since the refrigerating fan 24 of the conventional refrigerator discharges a cool air only toward a predetermined direction, much cool air are supplied to a center portion of the refrigerating compartment 20. A relatively less cool air is supplied to another part far from the cool air discharge direction, or to a corner of the refrigerating compartment(20), so that a temperature distribution of the refrigerating compartment 20 becomes not uniform.

In addition, if the door opening/closing sensor 36 senses the opening of the refrigerating compartment door 21 when performing a refrigerating operation, a refrigerating fan 70 stops operating, so that a cool air discharge operation is stopped. As a result, due to the door's opening, an external air of a high temperature is entered in the refrigerating compartment, a freshness of a stored food may be lowered, a cooling speed after closing the door may be considerably delayed.

SUMMARY OF THE INVENTION

Accordingly, the present invention is directed to a temperature control apparatus for a refrigerator and a control method therefor that substantially obviate one or more of the problems due to limitations and disadvantages of the related art.

It is an objective of the present invention to provide a temperature control apparatus for a refrigerator and a control method therefor, which mount an air circulation fan in addition to a prior refrigerating fan into the refrigerating compartment, drive the air circulation fan together with the refrigerating fan or drive only the air circulation fan, thereby obtaining a uniform cooling effect of a refrigerating compartment.

It is another objective of the present invention to provide a temperature control apparatus for a refrigerator and a control method therefore, which feebly circulate a cool air when opening a door of the refrigerating compartment, and quickly cool the refrigerating compartment after closing the door.

To achieve the above objectives, in a temperature control apparatus of a refrigerator which includes: a compressor for compressing a refrigerant, a refrigerating evaporator for generating a cool air, a refrigerating fan for discharging the cool air into a refrigerating compartment, a refrigerating compartment temperature sensor for sensing a temperature of the refrigerating compartment, and a door opening/ closing sensor for sensing an opening/closing state of a refrigerating compartment door, the temperature control apparatus of the refrigerator includes:

an air circulation fan which is additionally mounted to the refrigerating compartment, and is separated from the refrigerating fan; and a controller which drives the compressor, the refrigerating fan, and the air circulation fan if a refrigerating compartment temperature sensed by the refrigerating compartment temperature sensor is higher than a refrigerating compartment set temperature, and periodically turns on or off the air circulation fan under an off-state of the refrigerating fan if the refrigerating compartment door is opened.

The controller simultaneously drives the air circulation fan together with the refrigerating fan in order to perform a defrosting operation, if a temperature of the refrigerating compartment is beyond 0° C. under a compressor off-state caused by a satisfied temperature condition of the refrigerating compartment.

In a temperature control method for a refrigerator which includes: a compressor for compressing a refrigerant; first and second evaporators which are respectively mounted into a freezing compartment and a refrigerating compartment, and generate a cool air; freezing and refrigerating fans which respectively discharge the cool air generated from the first and second evaporators into the freezing compartment and the refrigerating compartment; an air circulation fan which is additionally mounted to the refrigerating compartment; a temperature sensing part for sensing a freezing compartment temperature and a refrigerating compartment temperature; and a door opening/closing sensor for sensing an opening/closing state of the doors of the freezing and refrigerating compartments, the temperature control method for the refrigerator includes the steps of:

(a) sensing a refrigerating compartment temperature;

(b) turning on the compressor, the refrigerating fan, and the air circulation fan, if the refrigerating compartment temperature is higher than a refrigerating compartment set temperature;

(c) if the refrigerating compartment door is opened during the step (b), turning off the refrigerating fan under an on-state of the compressor, and periodically turning on or off the air circulation fan; and (d) if a closing of the refrigerating compartment door is sensed after the step (c), turning on the refrigerating fan and the air circulation fan under an on-state of the compressor.

After the step(d), the temperature control method further includes the step of: (e) turning off the compressor and the refrigerating fan, and turning on the air circulation fan, if the refrigerating compartment temperature is reached to the refrigerating compartment set temperature.

After the step (e), if the refrigerating compartment temperature is beyond 0° C., the temperature control method simultaneously turns on the refrigerating fan and the air circulation fan under an off-state of the compressor.

BRIEF DESCRIPTION OF THE DRAWINGS

Further objects and other advantages of the present invention will become apparent from the following description in conjunction with the attached drawings, in which.

DETAILED DESCRIPTION OF THE PREFERRED EMBODIMENTS

The preferred embodiments of the present invention will now be described in detail with reference to the accompanying drawings.

Figure 3:
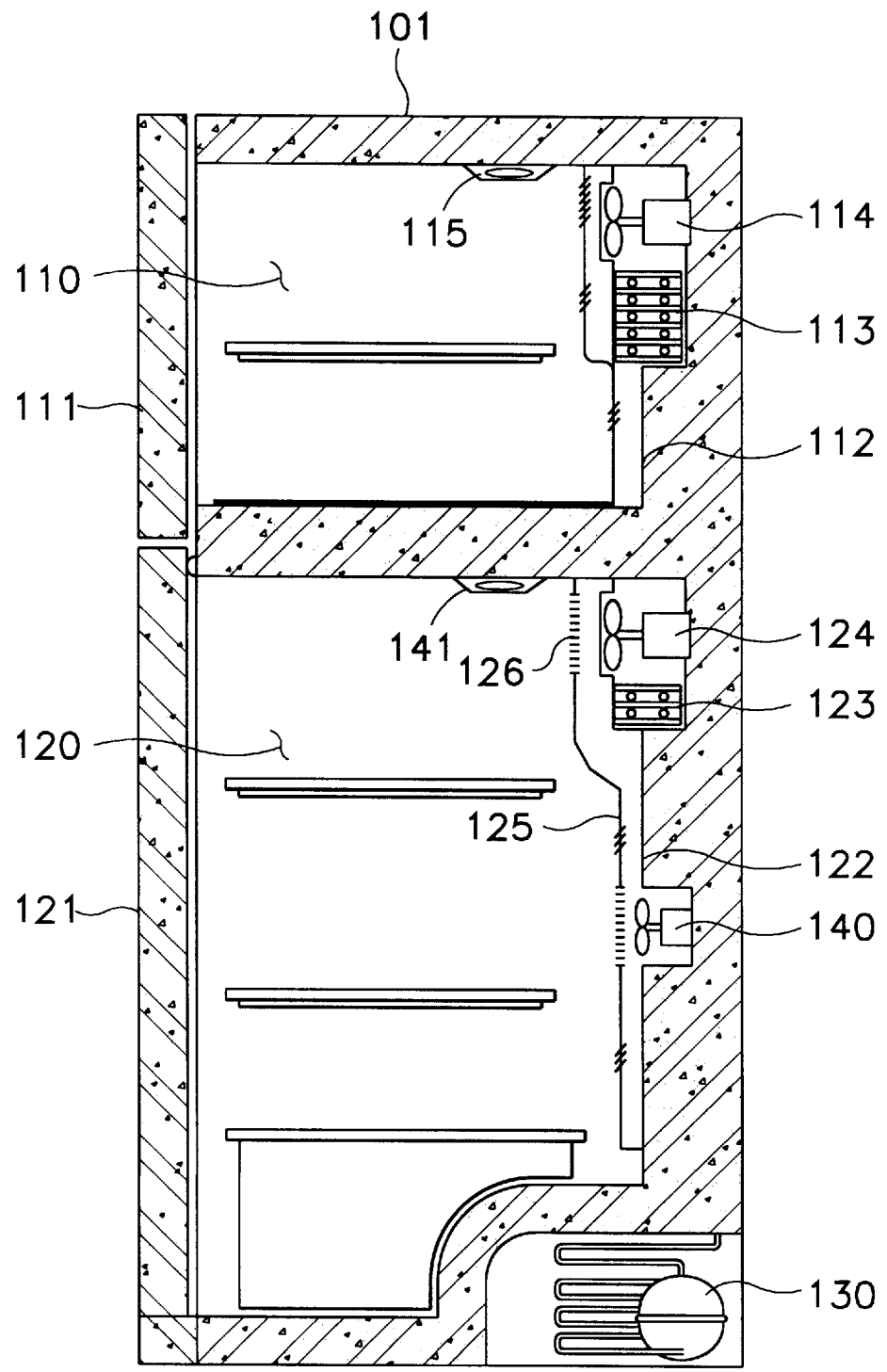
FIG. 3 shows an internal structure of a refrigerator according to the present invention.

FIG. 3 shows an internal structure of a refrigerator according to the present invention.

Referring to FIG. 3, a refrigerator according to the present invention includes a main body 101, a compressor 130, a freezing compartment 110, a freezing compartment door 111, a refrigerating compartment 120, a refrigerating compartment door 121. A freezing compartment temperature sensor 115, a freezing evaporator 113, and a freezing fan 114 are mounted into the freezing compartment 110. A refrigerating compartment temperature sensor 141, a refrigerating evaporator 123, and a refrigerating fan 124 are mounted into the refrigerating compartment 120.

An air circulation fan 140 is additionally mounted into the refrigerating compartment 120. The air circulation fan 140 is mounted in the duct 125 connected to the refrigerating fan 124, and discharges a cool air generated by the refrigerating evaporator 123 into the refrigerating compartment 120 by a low-speed rotation. A plurality of holes 126 are formed in the duct 125 positioned in front of the air circulation fan 140, and induces an air flow. By this air flow, the cool air inside of the refrigerating compartment 120 is more uniformly distributed in the refrigerating compartment 120 than only the refrigerating fan 124 is driven.

As to a rotation speed of the fans 114, 124, and 140, the freezing fan 114 and the refrigerating fan 124 are rotated at a high-speed, the air circulation fan 140 is relatively rotated at a low-speed as compared with the refrigerating fan 124.

Figure 1:
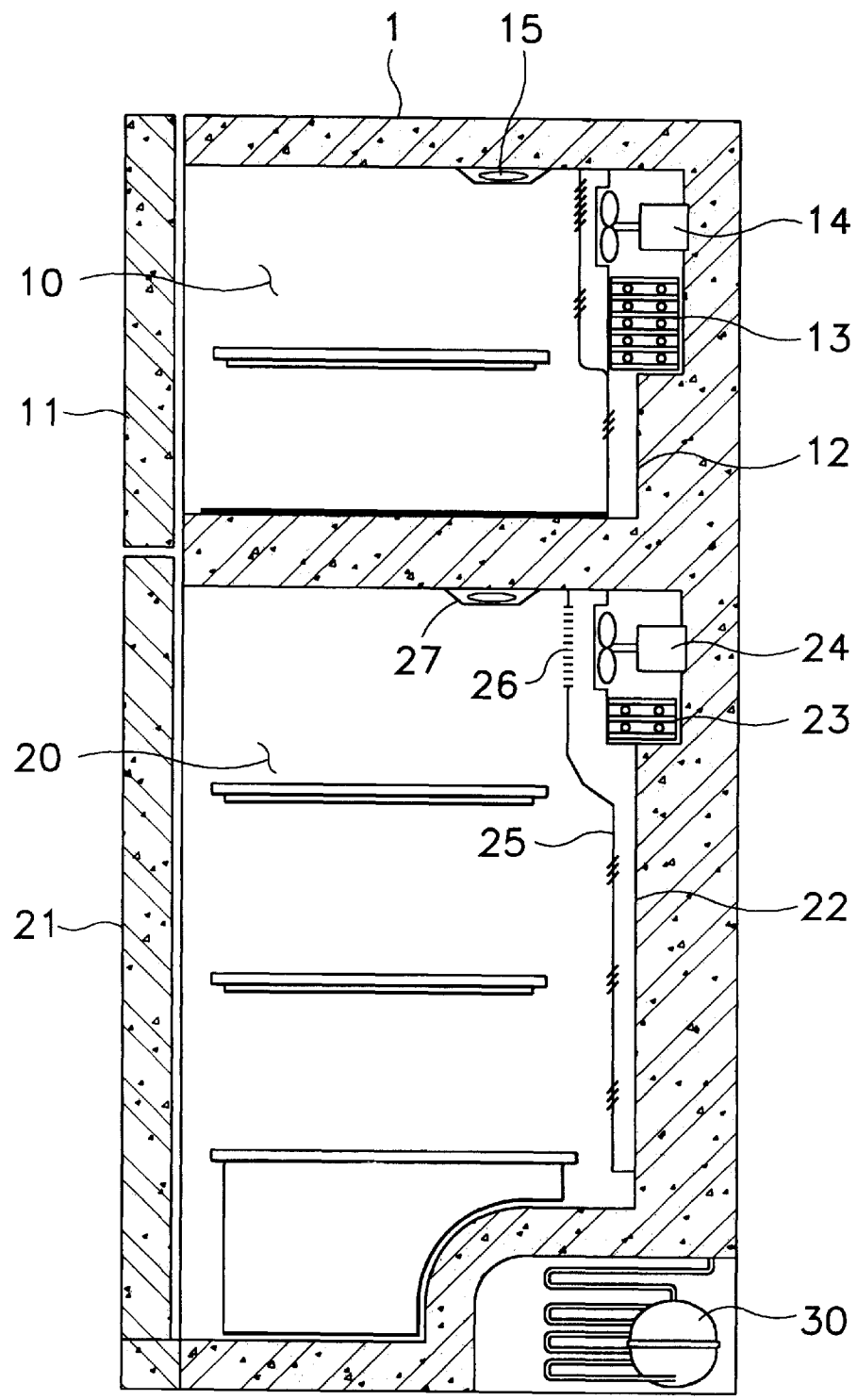
FIG. 1 shows an internal structure of a prior refrigerator.
Figure 2:
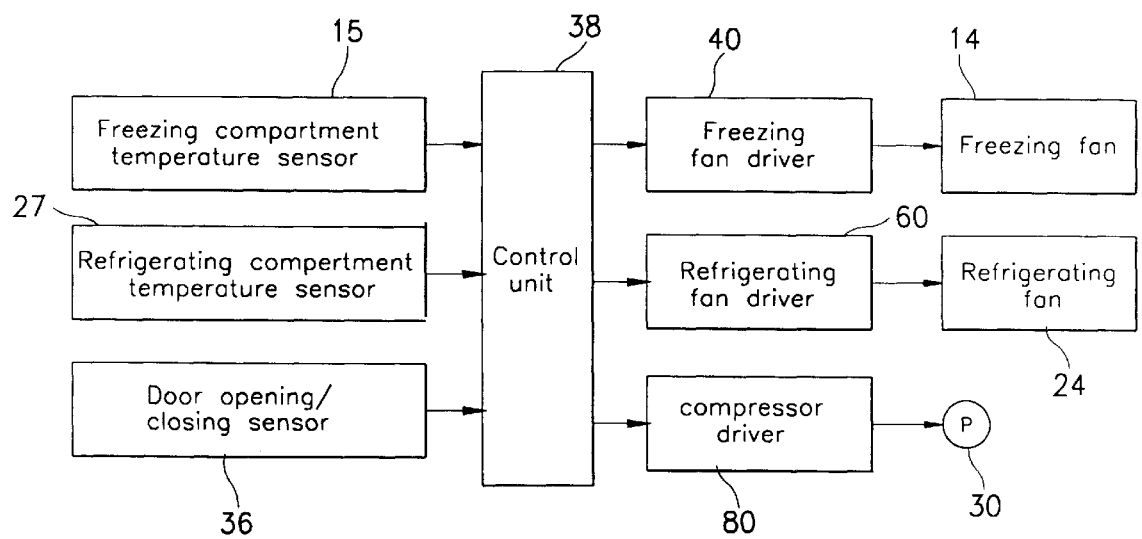
FIG. 2 is a block diagram of a temperature control apparatus for a prior refrigerator.
Figure 4:
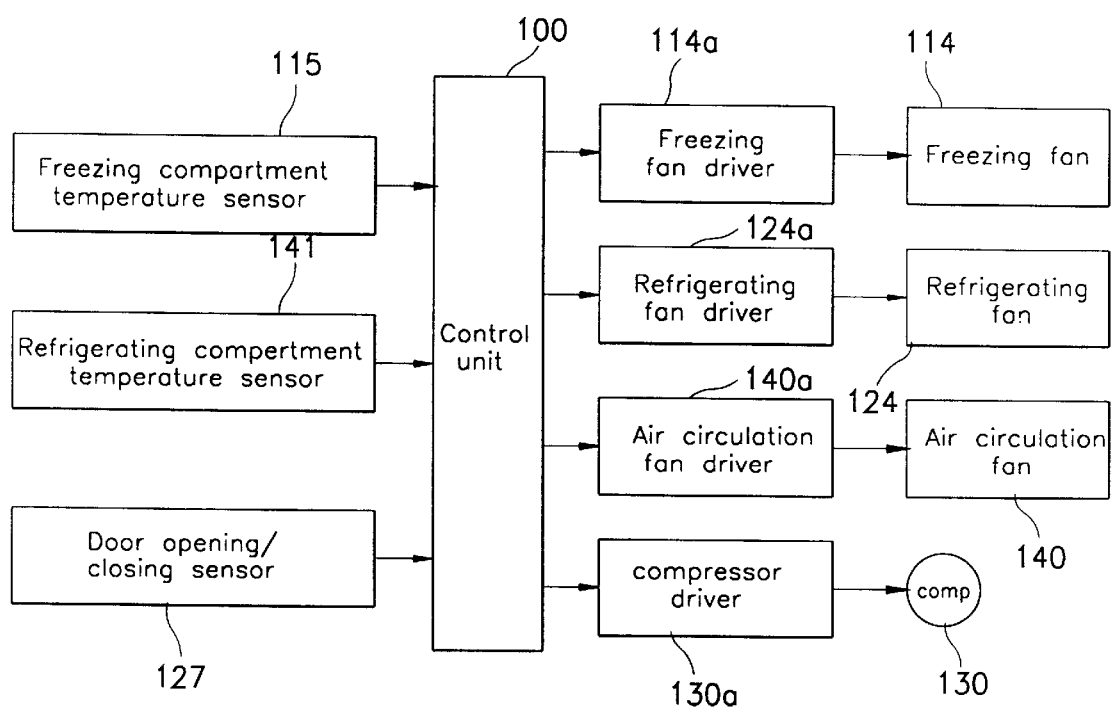
FIG. 4 is a block diagram of a temperature control apparatus for a refrigerator according to the present invention.

FIG. 4 is a block diagram of a temperature control apparatus for a refrigerator according to the present invention. Further to the structural components of FIG. 2, the temperature control apparatus includes: a door opening/closing sensor 127 for sensing an opening/closing state of the freezing compartment door 111 and the refrigerating compartment door 121; a controller 100 for controlling an on/off operation of the freezing fan 114, the refrigerating fan 124 and the air circulation fan 140, according to both each compartment temperature sensed by the freezing compartment temperature sensor 115 and the refrigerating compartment temperature sensor 141, and a door opening/closing state sensed by the door opening/closing sensor 127; a compressor driver 130a for outputting a driving signal to the compressor 130; a freezing fan diver 114a for outputting a driving signal to the freezing fan 114; a refrigerating fan driver 124a for outputting a driving signal to the refrigerating fan 124; and an air circulation fan driver 140a for outputting a driving signal to the air circulation fan 140.

The operations of the temperature control apparatus of the refrigerator according to the present invention will be described below.

The controller 100 controls each temperature of the freezing and refrigerating compartments according to an operation control program previously stored.

By comparing a freezing compartment set temperature and a refrigerating compartment set temperature with a freezing compartment temperature and a refrigerating compartment temperature, if it is determined that the cooling operation of the freezing compartment 110 and the refrigerating compartment 120 are needed, the controller 100 drives the freezing fan 114 and the refrigerating fan 124, simultaneously drives the air circulation fan 140 in order to achieve a uniform cooling of the refrigerating compartment 120 and to increase a cooling speed.

The controller 100 recognizes a door's opening/closing state by using a door opening/closing sensor 127 during the refrigerating operation and the freezing operation. If the freezing compartment door 111 is opened, the controller 100 stops the freezing fan 114, thereby a cool air discharge operation to the freezing compartment 110 is stopped.

If the refrigerating compartment door 121 is opened, the controller 100 does not stop the compressor 130, stops the refrigerating fan 124, stops a strong discharge operation of the cool air to the refrigerating compartment 120, and periodically turns on or off the air circulation fan 140 rotating at a low-speed. By the air circulation fan 140's driving, the cool air generated by the refrigerating evaporator 123 is feebly circulated, a refrigerating compartment temperature becomes uniform, a fast increasing of the refrigerating compartment temperature becomes prevented.

After that, the refrigerating compartment door 112 is closed, the controller 100 turns on the refrigerating fan 124 and the air circulation fan 140, and performs a cooling operation about the refrigerating compartment 120. If the refrigerating compartment temperature is reached to the refrigerating compartment set temperature during the cooling operation of the refrigerating compartment 120, and a temperature condition of the refrigerating compartment 120 is satisfied, the compressor 130 and the refrigerating fan 124 are stopped, but the air circulation fan 140 is continuously driven. As a result, a residual cool air from the refrigerating evaporator 123 is feebly circulated in the refrigerating compartment 120, thereby making a uniform temperature distribution in the refrigerating compartment 120 even if the refrigerating fan 124 is turned off.

Thereafter, the controller 100 determines whether or not the refrigerating compartment temperature is beyond 0° C. If the refrigerating compartment temperature is beyond 0° C., the controller 100 turns on the refrigerating fan 124 and the air circulation fan 140 under an off-state of the compressor 130, makes a relatively high temperature air of the refrigerating compartment 120 pass through the refrigerating evaporator 123, thereby performing a defrosting operation removing a frost of the evaporator 123.

Hereinafter, a temperature control method of a refrigerator according to the present invention will now be described with reference to FIGS. 5–6.

Figure 5:
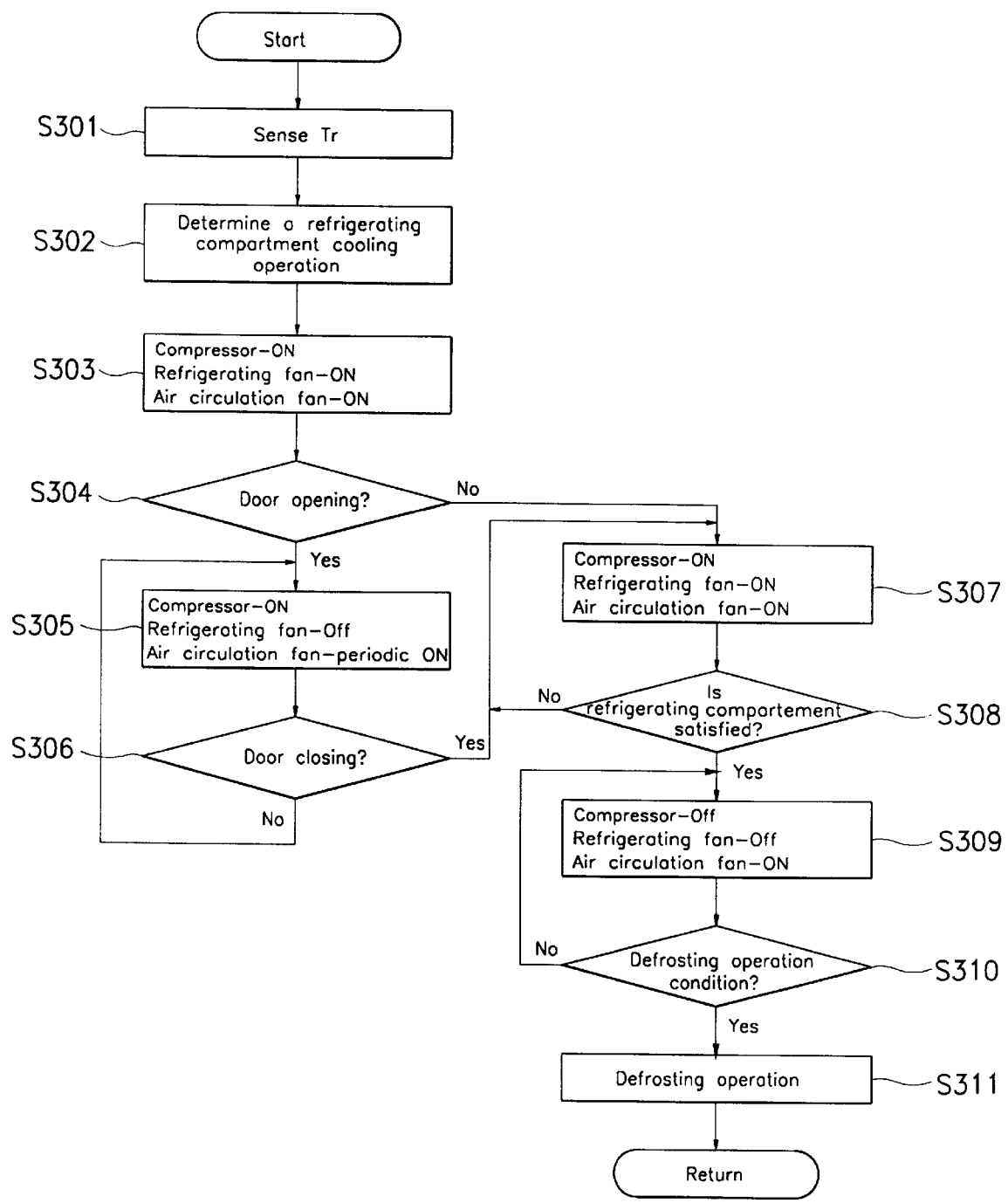
FIG. 5 shows a temperature control method for a refrigerator according to the present invention.
Figure 6:
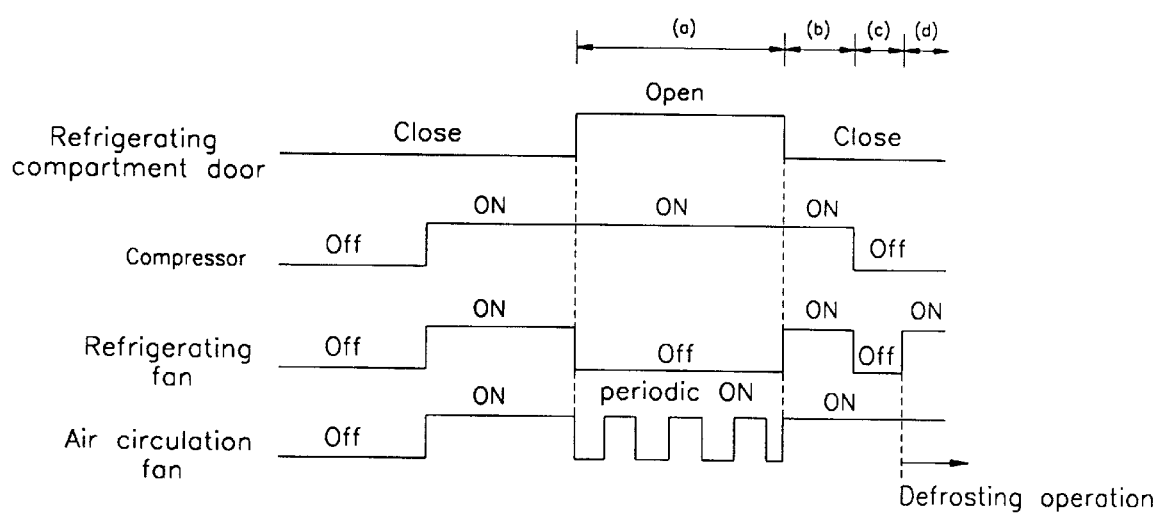
FIG. 6 shows a timing chart of each part of the refrigerator according to the present invention.

FIG. 5 shows a temperature control method for a refrigerator according to the present invention; and FIG. 6 shows a timing chart of each part of the refrigerator according to the present invention.

Referring to FIG. 5, the controller 100 senses a temperature (Tr) of the refrigerating compartment 120 by using a refrigerating compartment temperature sensor 141 (S301). If the sensed temperature of the refrigerating compartment 120 is higher than a refrigerating compartment set temperature, the controller 100 determines a cooling operation about the refrigerating compartment 120 (S302), turns on the compressor 130, the refrigerating fan 124, and the air circulation fan 140 (S303), and starts a cooling operation about the refrigerating compartment 120.

After that, the controller 100 determines whether the refrigerating compartment door 121 is opened or not by using the door opening/closing sensor 127 (S304). If the refrigerating compartment door 121 is opened in the step S304, as shown in a period (a) of FIG. 6, the controller 100 stops the refrigerating fan 124 under an on-state of the compressor 130, and periodically repeats an on/off operation of the air circulation fan 140 (S305). Accordingly, the cool air generated from the refrigerating evaporator 123 is feebly circulated, an inner temperature of the refrigerating compartment 120 becomes uniform, and an abrupt increasing of the inner temperature becomes prevented.

The controller 100 determines whether or not the refrigerating compartment door 121 is closed by using the door opening/closing sensor 127 (S306). If the refrigerating compartment door 121 is closed, as shown in a period (b) of FIG. 6, the controller 100 turns on again the refrigerating fan 124 and the air circulation fan 140 (S307).

After the step S307, the controller 100 determines whether or not the refrigerating compartment temperature is reached to the refrigerating compartment set temperature (S308), that is, the controller 100 determines whether the temperature condition of the refrigerating compartment 120 is satisfied or not. If the temperature condition of the refrigerating compartment 120 is satisfied in the step S308, as shown in a period (c) of FIG. 6, the controller 100 turns off the compressor 130 and the refrigerating fan 124, and continuously maintains an on-state of the air circulation fan 140 (S309). Accordingly, a cool air is feebly circulated in the refrigerating compartment 120, thereby achieving a uniform temperature distribution in the refrigerating compartment 120 even if the refrigerating fan 124 is turned off.

After turning off the compressor 130 under the condition that the refrigerating compartment 120 is satisfied, the controller 100 determines whether or not a refrigerating compartment temperature is beyond 0° C. (S310). The step S310 is provided to determine a defrosting operation condition. If the refrigerating compartment temperature is beyond 0° C. in the step S310, as shown in the period (d) of FIG. 6, the controller 100 turns on the refrigerating fan 124 and the air circulation fan 140 under an off-state of the compressor 130, makes a relatively high temperature air of the refrigerating compartment 120 pass through the refrigerating evaporator 123, thereby performing a defrosting operation removing a frost of the evaporator 123 (S311).

As described above, the temperature control apparatus for a refrigerator and a control method therefor according to the present invention, mount an air circulation fan in addition to a prior refrigerating fan into the refrigerating compartment, drive the air circulation fan together with the refrigerating fan or drive only the air circulation fan, obtain a uniform cooling effect of a refrigerating compartment, feebly circulate a cool air when opening a door of the refrigerating compartment, and quickly cool the refrigerating compartment after closing the door.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. In a temperature control apparatus of a refrigerator which includes: a compressor for compressing a refrigerant, a refrigerating compartment evaporator for generating a cool air, a refrigerating fan for discharging the cool air into a refrigerating compartment, a refrigerating compartment temperature sensor for sensing a temperature of the refrigerating compartment, and a door opening/closing sensor for sensing an opening/closing of a refrigerating compartment door, the temperature control apparatus of the refrigerator comprising:

an air circulation fan which is additionally mounted to the refrigerating compartment, and is separated from the refrigerating fan; and a controller which drives the compressor, the refrigerating fan, and the air circulation fan if a refrigerating compartment temperature sensed by the refrigerating compartment temperature sensor is higher than a refrigerating compartment set temperature, and periodically turns on or off the air circulation fan under an off-state of the refrigerating fan if the refrigerating compartment door is opened.

2. The temperature control apparatus according to claim 1, wherein:

the controller simultaneously drives the air circulation fan together with the refrigerating fan in order to perform a defrosting operation, if the refrigerating compartment temperature is beyond 0° C. under a compressor off-state caused by a satisfied temperature condition of the refrigerating compartment.

3. In a temperature control method for a refrigerator which includes: a compressor for compressing a refrigerant; first and second evaporators which are respectively mounted into a freezing compartment and a refrigerating compartment, and generate a cool air; freezing and refrigerating fans which respectively discharge the cool air generated from the first and second evaporators into the freezing compartment and the refrigerating compartment; an air circulation fan which is additionally mounted to the refrigerating compartment; a temperature sensing part for sensing a freezing compartment temperature and a refrigerating compartment temperature; and a door opening/closing sensor for sensing an opening/closing state of the doors of the freezing and refrigerating compartments, the temperature control method for the refrigerator comprising the steps of:

(a) sensing a refrigerating compartment temperature;

(b) turning on the compressor, the refrigerating fan, and the air circulation fan, if the refrigerating compartment temperature is higher than a refrigerating compartment set temperature;

(c) if the refrigerating compartment door is opened during the step (b), turning off the refrigerating fan under an on-state of the compressor, and periodically turning on/off the air circulation fan; and (d) if a closing of the refrigerating compartment door is sensed after the step (c), turning on the refrigerating fan and the air circulation fan under an on-state of the compressor.

4. The temperature control method according to claim 3, further comprising the step of:

(e) turning off the compressor and the refrigerating fan, and turning on the air circulation fan, if the refrigerating compartment temperature is reached to the refrigerating compartment set temperature after the step (d).

5. The temperature control method according to claim 3, further comprising the step of:

(f) simultaneously turning on the refrigerating fan and the air circulation fan under an off-state of the compressor, if the refrigerating compartment temperature is beyond 0° C. after the step (e).

* * * * *